United States Patent [19]

Bauer

[11] Patent Number: 4,582,186

[45] Date of Patent: Apr. 15, 1986

[54] ANNULAR DISC ASSEMBLY

[75] Inventor: Friedrich Bauer, Vienna, Austria

[73] Assignee: ENFO Grundlagenforschungs AG, Döttingen, Switzerland

[21] Appl. No.: 625,091

[22] Filed: Jun. 27, 1984

[30] Foreign Application Priority Data

Jun. 29, 1983 [AT] Austria .................... 2393/83

[51] Int. Cl.⁴ .................................. F16D 23/00
[52] U.S. Cl. .................. 192/89 B; 192/107 R; 192/107 M
[58] Field of Search ............ 192/89 B, 107 M, 107 R, 192/107 T, 107 C, 89 R, 89 A, 89 QT, 89 W

[56] References Cited

U.S. PATENT DOCUMENTS

| | | | |
|---|---|---|---|
| 2,073,146 | 3/1937 | Gardiner | 192/89 B X |
| 2,728,700 | 12/1955 | Gatke | 192/107 M X |
| 2,901,388 | 8/1959 | Morton | 192/107 M |
| 3,417,846 | 12/1968 | Cook | 192/89 B |
| 3,526,306 | 9/1970 | Bentz et al. | 192/107 M |
| 3,730,320 | 5/1973 | Freeder et al. | 192/107 |
| 3,732,953 | 5/1973 | Huet | 192/107 M X |
| 3,932,568 | 1/1976 | Watts et al. | 192/107 M X |

Primary Examiner—Larry Jones
Attorney, Agent, or Firm—Watson, Cole, Grindle & Watson

[57] ABSTRACT

A disc assembly comprises a plurality of substantially radially spaced spokes joined together by intermediate walls of flexible material. The disc assembly can be used to transmit forces in a force transmission system such as a multiple disc clutch. Such a system comprises a member for applying an input force, a member for receiving an output force, and the inventive annular disc assembly, the disc assembly having force transmission and force application regions at its inner and outer edges and at an intermediate region, the noted members being in engagement with at least some of the force transmission and force application regions.

8 Claims, 3 Drawing Figures

U.S. Patent   Apr. 15, 1986   4,582,186
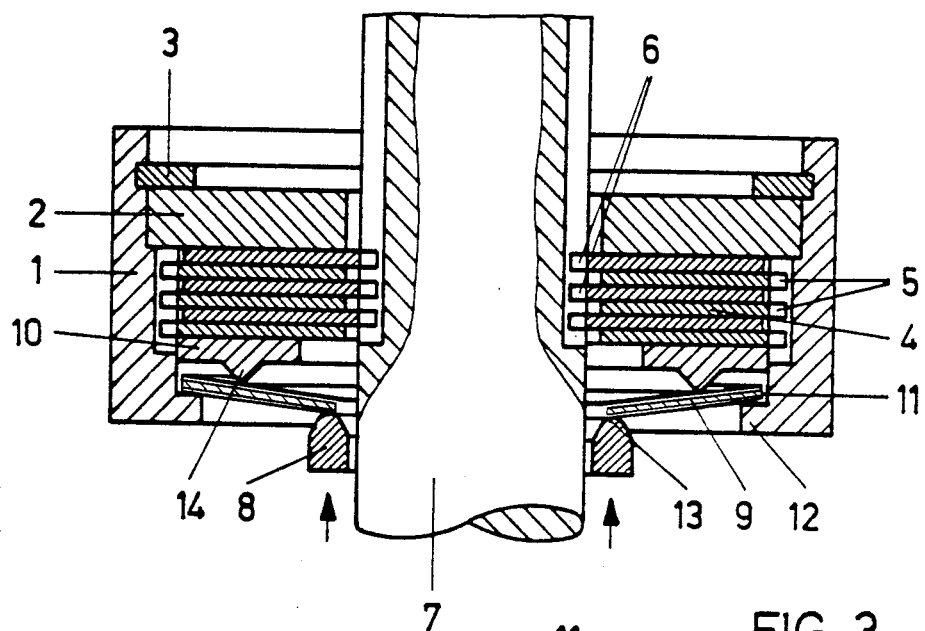
FIG. 1
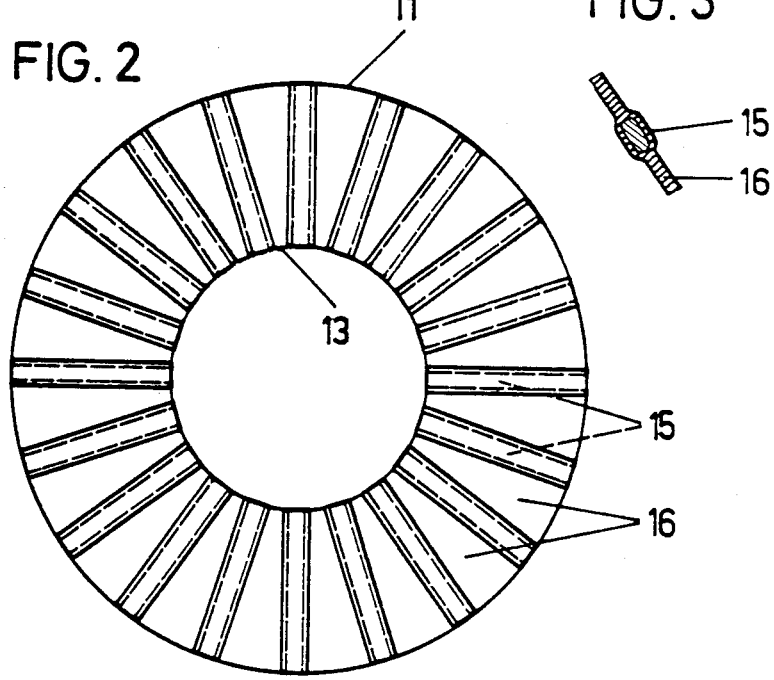
FIG. 2
FIG. 3

ANNULAR DISC ASSEMBLY

BACKGROUND OF THE INVENTION

This invention relates to an annular disc assembly for transmitting displacement forces. It may be used as a force transmission system in a multiple disc clutch.

Known systems comprise discs or plates of spring steel which are provided with notches extending radially from the edges. The radial crosspieces formed between adjacent notches are used to transmit the displacement forces. In order to be able to transmit sufficiently large forces and to withstand the bending stresses occurring in this connection, the lever discs have to be relatively thick. The resistance to deformation resulting therefrom has to be overcome when the displacement forces are transmitted, as a result of which the actuation force required is increased. In addition, the known disc assemblies can break, particularly in the notched regions.

It is an object of the invention to provide a disc assembly capable of transmitting large forces.

It is another object of the invention to provide a disc assembly which is deformable by relatively small actuating forces.

It is a further object of the invention to provide a disc assembly with an improved resistance to breakage.

SUMMARY OF THE INVENTION

These objects are achieved in a disc assembly comprising an annular disc assembly comprising a plurality of substantially radial spaced spokes joined together by intermediate walls of flexible material.

BRIEF DESCRIPTION OF THE DRAWINGS

FIG. 1 shows an axial centre section through a disc clutch with a disc assembly for transmitting forces according to an embodiment of the invention;

FIG. 2 shows the disc assembly in plan; and

FIG. 3 shows a section through a detail of the disc assembly on a larger scale.

DETAILED DESCRIPTION

The multiple disc clutch shown in FIG. 1 consists of a cup-shaped housing 1 which is sealed by an annular cover 2 is retained in the housing 1 by means of a spring ring 3. In the interior of the housing 1 there is disposed a stack of discs 4 whose discs are supported in teeth alternately on the outer edge or the inner edge. The discs supported in the outer teeth 5 are mounted in the housing 1, whereas the discs supported in the inner teeth 6 are non-rotatably connected to a shaft 7 by means of grooves formed therein. A thrust collar 8 is arranged concentrically about the shaft 7 and acts as a force transmission member via disc assembly 9 on a force application member in the form of a pressure plate 10 abutting against the stack of discs 4. The disc assembly 9 is supported with its outer edge 11 on a force application member in the form of an offset portion 12 of the housing 1 and its inner edge 13 lies on the thrust collar 8. The pressure plate 10 has a bead 14 by which it is supported on the disc assembly 9 between its inner edge 13 and its outer edge 11.

As FIGS. 2 and 3 show, the disc assembly 9 comprises rods 15 which are separate from one another, extend radially and are arranged at a distance from one another. The individual rods 15 are connected to one another by intermediate walls 16. The rods 15 advantageously consist of material which is resistant to bending, such as steel, and can have any cross-section. In the embodiment the rods 15 have an oval cross-section. Other typical cross-sections are circular and rectangular. They are embedded in a disc of resilient material, e.g., of rubber or plastic material, which forms the intermediate walls 16. This material is preferably reinforced with textile fabric.

The displacement forces for actuating the multiple disc clutch are exerted on the thrust collar 8 in the direction of the arrows shown in FIG. 1. From the ring they are transmitted via the disc assembly 9 to the pressure plate 10 which presses the stack of disc 4 against the cover 2, as a result of which the clutch is engaged. In this connection the displacement forces are transmitted solely by the rods 15 of the disc assembly 9. The task of the intermediate walls 16 is merely to retain the rods 15 in such a way that the intermediate walls 16 can be thin and have practically no resistance to deformation.

I claim:

1. An elastically deformable annular disc assembly for use in transferring actuating forces in a force transmission system, said elastically deformable annular disc assembly having an inner edge for receiving an input force, an intermediate region for transmitting the input force, and an outer edge which can be fixedly positioned, said annular disc assembly comprising a plurality of spaced apart resilient steel rods which are radially oriented with respect to an imaginary center point within said annular disc assembly and which extend from said inner edge to said outer edge, and a plurality of flexible intermediate rubber walls which respectively extend between each adjacent pair of resilient rods from said inner edge to said outer edge.

2. An annular assembly as defined in claim 1, wherein each of said plurality of resilient steel rods has an oval cross section.

3. An annular assembly as defined in claim 1, wherein each of said plurality of flexible intermediate rubber walls comprises a portion of single flexible annular rubber member.

4. An annular assembly as defined in claim 3, wherein said flexible annular rubber member is reinforced with a textile fabric.

5. In a force transmission system which includes a generally cylindrical, rotatable housing having an inwardly-extending lip; a rotatable shaft which extends through said housing; a plurality of rigid disc positioned in a stack within said housing; a first group of said rigid discs being connected to said shaft and a second group of said discs being connected to said housing; a pressure plate located in said housing between said stack of said rigid discs and said inwardly-extending lip; and a spring disc means, said spring disc means having an outer peripheral edge which is wedged between said pressure plate and said inwardly-extending lip and an inner edge which is freely movable toward and away from said pressure plate to move said pressure plate toward and away from said stack of rigid discs to control the force of contact between said first and second groups of rigid discs and thus control the relative rotation of said housing and said shaft; the improvement wherein said spring disc means comprises an annular disc assembly which includes a plurality of spaced apart resilient rods which are radially oriented with respect to an imaginary center point within said annular disc assembly and which extend from said inner edge to said outer edge, and a plurality of flexible intermediate walls which respectively extend between each adjacent pair of resilient rods from said inner edge to said outer edge.

6. The force transmission system as defined in claim 5, wherein said resilient rods are made of steel.

7. In a force transmission system which includes a housing, a plurality of friction discs positioned in a stack within said housing; a pressure plate located with said housing for transmitting an input force to said stack of friction plates, and an annular disc assembly for transmitting an input force to said pressure plate, said annular disc assembly including an inner edge, an outer edge and an intermediate region, said outer edge being fixedly positioned and said inner edge being movable toward said stack of friction discs such that its intermediate region can be used to transmit an input force to said pressure plate, and a member for applying an input force to the inner edge of said annular disc assembly to move it toward said pressure plate; the improvement wherein said annular disc assembly comprises a plurality of spaced apart resilient rods which are radially oriented with respect to an imaginary center point within said annular disc assembly and which extend from said inner edge to said outer edge, and a plurality of flexible intermediate walls which respectively extend between each adjacent pair of resilient rods from said inner edge to said outer edge.

8. The force transmission system as defined in claim 7, wherein said resilient rods are made of steel.

* * * * *